United States Patent [19]

Triplett

[11] Patent Number: 4,519,465
[45] Date of Patent: May 28, 1985

[54] TRACK TYPE FOUR SPROCKET WHEEL DRIVE CRAWLER TRACTOR

[76] Inventor: Richard A. Triplett, Star Rte. 2 Box 234, Laytonville, Calif. 95454

[21] Appl. No.: 362,544

[22] Filed: Mar. 26, 1982

[51] Int. Cl.³ .............................................. B62D 11/04
[52] U.S. Cl. .................................... 180/6.48; 180/6.2; 180/9.48; 305/22
[58] Field of Search ...................... 180/6.48, 6.2, 9.48, 180/9.2; 305/16, 21, 22, 32, 60

[56] References Cited

U.S. PATENT DOCUMENTS

| | | | |
|---|---|---|---|
| 1,079,164 | 11/1913 | Chenette | 180/9.62 |
| 3,082,044 | 3/1963 | Klemm et al. | 305/32 |
| 3,154,164 | 10/1964 | Shaw et al. | 180/6.48 |
| 3,385,255 | 5/1968 | Raymond et al. | 180/6.2 |
| 3,494,439 | 2/1970 | Kline | 180/6.48 |
| 3,710,886 | 1/1973 | Wagner | 180/9.2 R |
| 3,865,208 | 2/1975 | Crawshay et al. | 180/6.62 |

Primary Examiner—Joseph F. Peters, Jr.
Assistant Examiner—Donn McGiehan
Attorney, Agent, or Firm—Charles N. Hilke

[57] ABSTRACT

A crawler tractor using hydraulic pumps and motors for propulsion. One hydraulic pump operates fore and aft hydraulic motors on the same side of the tractor. Two cross members are used to join the undercarriage to the cab. The two cross members are replaceable with other cross members to change the width between the tracks and to change ground clearance of the cab. Single screwable means adjust the length of the undercarriage.

6 Claims, 7 Drawing Figures

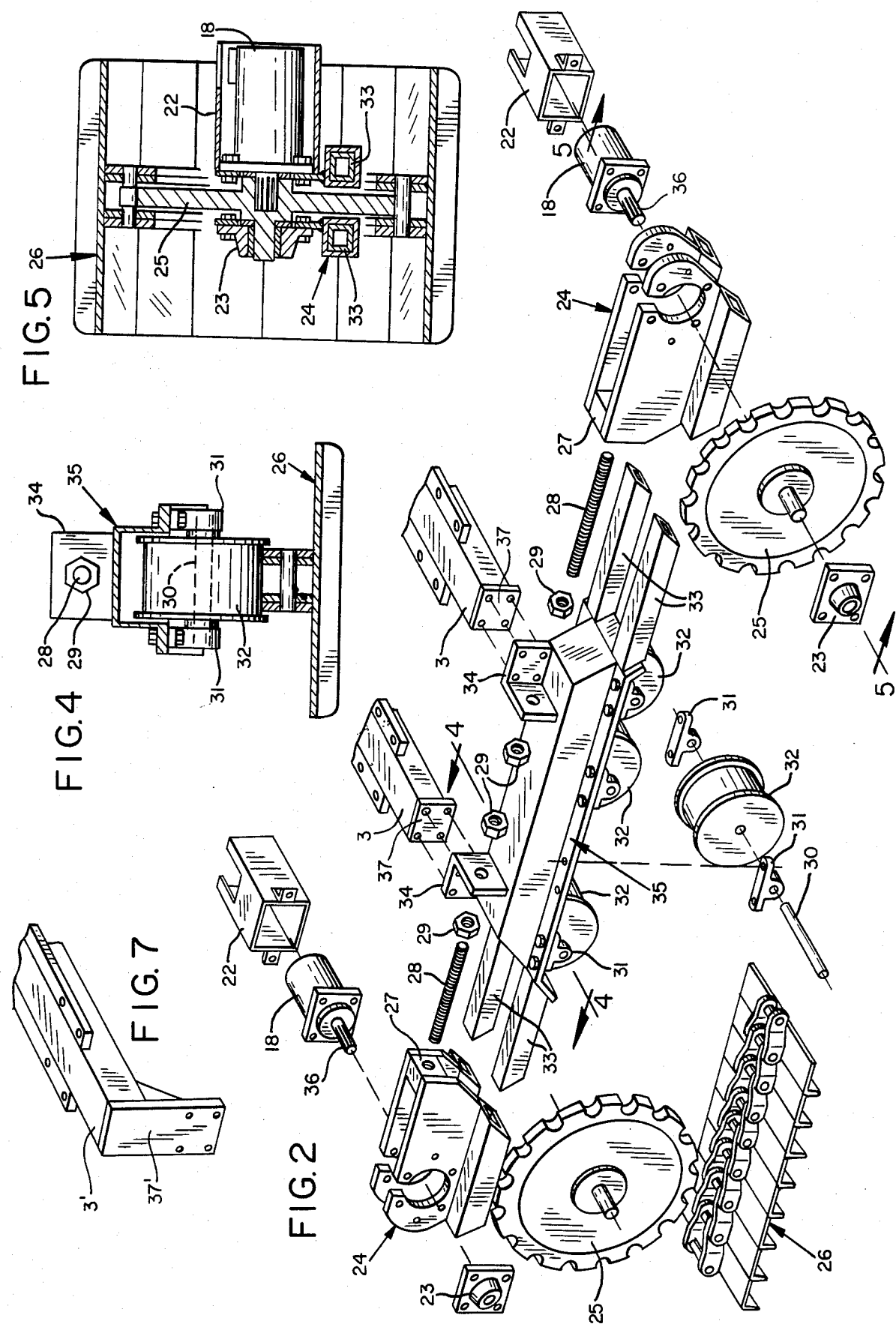

TRACK TYPE FOUR SPROCKET WHEEL DRIVE CRAWLER TRACTOR

BACKGROUND OF THE INVENTION

This invention relates to a simply designed, constructed and maintained four-wheel sprocket drive crawler tractor.

Previous art discloses four-wheel drive apparatuses using a hydraulic pump and a hydraulic motor in U.S. Pat. No. 3,865,208 where a flow equalizer and/or a distribution box are utilized.

Means utilizing tension springs or screws to keep the track properly tension are well known in the industry, see for example, U.S. Pat. No. 1,079,164 and U.S. Pat. No. 3,082,044.

Certain farming rubber wheel tractor vehicles have provided means through extensions of the axle for the positioning of rubber tires to correspond to crop spacing.

Separate devices interconnected in the fluid line are well known in prior art for cooling the hydraulic fluid.

SUMMARY OF THE INVENTION

It is an object of this invention to provide a simply constructed four sprocket wheel drive crawler tractor which is reliable and easily maintained and, when necessary, easily repaired.

Furthermore, another object of this invention is to provide a minimum number of replacement parts by interchangability of parts, i.e., commonality of fore and aft and of right and left and of hydraulic hoses.

Another object is to provide a simple propulsion system with a high degree of manuverability.

Another further object is to provide a simple means for varying ground clearance and changing distance between tracks.

It is a further object to provide means for maintaining proper track tension while at the same time having means to adjust for different track lengths.

Finally, it is an object to provide cooling means for the hydraulic fluid.

DESCRIPTION OF THE DRAWINGS

FIG. 2 is an exploded perspective view showing in detail the parts of the undercarriage.

FIG. 4 is a view along 4—4 shown in FIG. 2 of a detail of a roller and track system.

FIG. 5 is a detail of a sprocket, track and motor along line 5—5 shown in FIG. 2.

FIG. 7 is a perspective view of a cross member and attachment showing the means for increased ground clearance.

DETAILED DISCLOSURE

Figure 1:
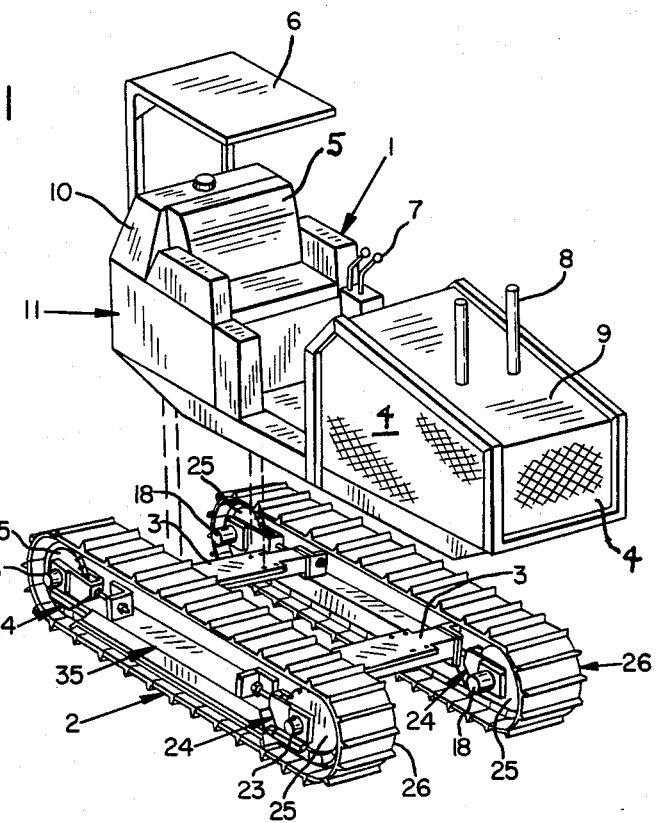
FIG. 1 is a perspective view showing a cab separated from an undercarriage.

FIG. 1 shows the three main parts of the crawler tractor: a cab 1, and undercarriage 2, and cross members 3. The rear portion of the cab 1 contains an operator's seat 5, controls 7, hydraulic reservoir 11, fuel tank 10, and canopy 6. The forward portion of the cab 1 contains an engine (not shown), an hydraulic system (not shown), exhaust pipes 8, engine cover 9, and side covers 4.

Turning to FIG. 2 where one side of the tractor is shown, hydraulic motors 18 are attached to slideable mounts 24. Motor covers 22 also attach to the slideable mounts 24, while the sproekts 25 are positioned in the center portion of slideable mounts 24 and are connected for rotation with the motor shafts 36. Bearings 23 are attached to the slideable mount 24. Forks 33 of a roller unit 35 fit into the slideable mounts 24. Screws 28 are threaded in mount nuts 27 fixably attached to slideable mounts 24 and are also helds by two nuts 29 to each of the brackets 34 which are welded to the top of the roller unit 35. A plurality of rollers 32 by means of roller pins 30 are attached by roller mounts 31 to the roller unit 35. The cross members 3 are attached to the brackets 34 by means of end attachments 37 which are welded to the cross members 3. Finally track 26 fits around the sprockets 25.

Figure 3:
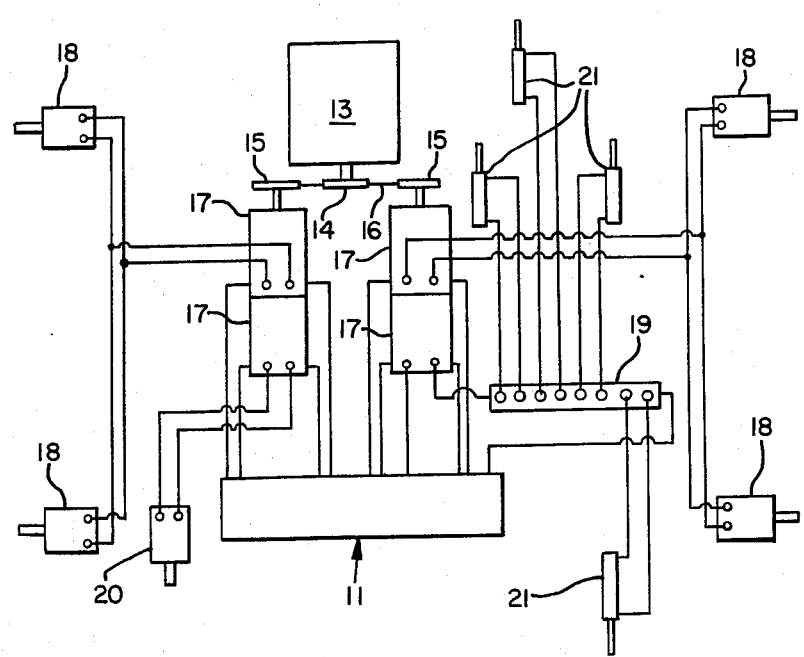
FIG. 3 is a schematic of a hydraulic system.

FIG. 3 is a schematic of the entire hydraulic system. A motor 13 turns motor pulley 14 which by means of belt 16 turns both sets of hydraulic pumps 17 by the hydraulic pulleys 15. The fore and aft hydraulic pumps 17 are interconnected and both are operable through the hydraulic pulleys 15. The hydraulic pumps 17 are variable speed and provide forward and reverse flow. Each fore hydraulic pump 17 is connected to two hydraulic motors 18 located forward and aft on the same side of the tractor. One aft hydraulic pump 17 operates a power take off (PTO) 20, the other aft hydraulic pump 17 operates through a valve bank 19 variously arranged accessory cylinders 21. The hydraulic fluid is maintained in an hydraulic fluid reservoir 11.

FIG. 4 is a sectional view showing roller 32 riding on the track 26. The roller pin 30 is shown held to the roller unit 35 by the roller mount 31. The bracket 34 attached to the roller unit 35 is shown along with the nut 29 and the screw 28.

FIG. 5 is a sectional view showing the hydraulic motor 18 attached to the sprocket 25, which in turn is held by the bearing 23. The forks 33 are shown inside the slideable mount 24. The bearing 23 and the hydraulic motor 18 are attached to the slideable mount 24. The track 26 is shown connected to the sprocket 25. The motor cover 22 is shown mounted around the hydraulic motor 18.

Figure 6:
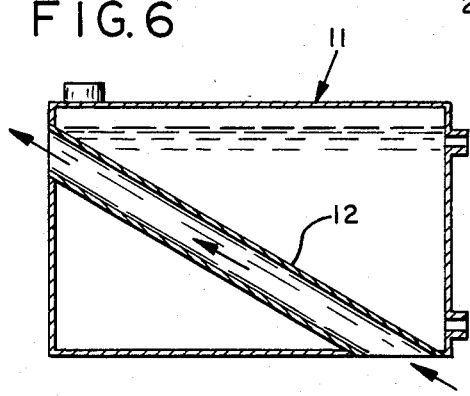
FIG. 6 is a section view of a hydraulic tank with vents.

In FIG. 6 air vent 12 is shown through the hydraulic fluid reservoir 11.

In FIG. 7 cross member 3' is shown where the height clearance of the tractor is increased by means of end attachment 37' which is welded to cross member 3' and bolted to brackets 34 shown in FIG. 2.

As shown in FIG. 6, the hydraulic fluid reservoir 11 is provided with air vent 12 diagonally through the hydraulic fluid reservoir 11. In operation, as the tractor is moving the air is forced under the cab to the air vent 12. The heat of the hydraulic fluid contained in hydraulic fluid reservoir 11 is transferred to the air moving through the vent 12.

Referring to FIG. 7, the cross member 3' provides more ground clearance than the cross member 3 of FIGS. 2 and 1. Removing the cab 1 from the cross member 3 (FIG. 1) and the cross member 3 from bracket 34 (FIG. 2) allows the removal of cross member 3 and replacement by cross member 3'. A comparison of end attachment 37 and end attachment 37' shows the increased clearance. The cross member 3' is raised further above the ground by the increased length of end attachment 37'. Furthermore, the cross member 3 and the cross member 3' can be made with different lengths.

Referring now to FIG. 2, turning the nuts 29 causes the slideable mount 24 to be moved backward or forward on the forks 33. Thus, the length of the undercarriage 2 is changed and adjustable by a single screw 28. As can readily be seen, this action allows proper tension to be placed on the track 26. Because of the length of the forks 33, the undercarriage 2 (FIG. 1) is capable of handling various lengths of track 26. For example, if several sections of track broke during operation, the track could be reattached by the movement of the slideable mounts 24 to their closest position to the roller unit 35.

In operation, the motor 13 turns the engine pulley 14, which, by means of belt 16 turns both hydraulic pulleys 15. In the operation of one side of the tractor, the hydraulic pulley 15 operates the fore and aft hydraulic pumps 17. Each one of the fore hydraulic pumps 17 operates fore and aft hydraulic motors 18 contained on the same side of the crawler tractor. The fore and aft hydraulic motors 18 do not require flow equalizers because they must turn at the same rate because of the mechanical connections between the hydraulic motors 18, the sprockets 25, and the interconnection of the sprockets 25 to the same track 26. In other words, if the fore hydraulic motor 18 tries to revolve more rapidly than the aft hydraulic motor 18 on the same side of the tractor, the track 26 will prevent this from happening because the track 26 can move at one speed only. Thus, fore and aft hydraulic motors 18 must revolve at the same rate equalizing hydraulic fluid flow through the fore hydraulic pump 17 and the fore and aft hydraulic motors 18. Each track operates independently.

As can readily be seen, the crawler tractor is highly maneuverable because one track 26 can be operated forward and the other track 26 can be operated in reverse. This is due to the separate hydraulic pumps 17 operating each separate track 26. Of course, any combinations of track 26 speed can be maintained from full reverse to full forward.

One aft hydraulic pump 17 operates a PTO 20. The other aft hydraulic pump 17 operates through a valve bank 19 from which four accessory cylinders 21 are operated.

Referring to FIGS. 1 and 2, shows that two cross members 3 are used to join the cab 1 to the undercarriage 2.

The hydraulic pumps 17 are all interchangeable. The hydraulic motors 18 are all interchangeable. The slideable amounts 24 are all interchangeable. The sprockets 25 are all interchangeable. The motor covers 22 are all interchangeable. The roller unit 35 is interchangeable. Thus, maintenance costs and parts inventory costs are at a minimum.

It is understood that various changes in the details and arrangement of parts, which have been described and illustrated to explain the nature of the invention, may be made by those skilled in the art as may come within the scope of the claim without departing from the spirit of the invention.

I claim:

1. A four wheel sprocket drive crawler tractor comprising:
   a. A cab;
   b. an undercarriage;
   c. cross members; and
   d. means for propulsion with means for equalizing hydraulic fluid flow through a hydraulic pump and a fore and aft hydraulic motor, with one hydraulic pump connecting to fore and aft hydraulic motor on one side of the tractor, and with one other hydraulic pump connecting to another fore and aft hydraulic motor on the other side of the tractor.

2. A four wheel sprocket drive crawler tractor of claim 1 wherein said means for equalizing hydraulic fluid flow through a hydraulic pump and a fore and an aft hydraulic motor comprise connecting the hydraulic pump to fore and aft hydraulic motors on the same side of the tractor where said hydraulic motors are connected first to sprockets which are in turn interconnected to the same track.

3. A four wheel sprocket drive crawler tractor of claim 1 wherein said means for changing the length of the undercarriage comprises slideable mounts attached slideably to forks and adjustable by single screwable means to a roller unit.

4. A four wheel sprocket drive crawler tractor of claim 1 wherein said cross members are replaceable removeably with cross members of increased or decreased length.

5. A four wheel sprocket drive crawler tractor of claim 1 wherein said cross members are removeably replaceable by cross members of increased or decreased height of end attachment.

6. A four wheel sproket drive crawler tractor of claim 1 where the cab and undercarriage are joined together by two cross members.

* * * * *